3,559,399
SERVOMOTOR ASSEMBLY

Ingolf Johnsen, Havnbjerg, near Nordborg, and Jens Gammelby Jensen, Holm, near Nordborg, Denmark, assignors to Danfoss A/S, Nordborg, Denmark, a company of Denmark
Filed Apr. 28, 1969, Ser. No. 819,740
Int. Cl. F01k 27/00; F03g 7/00
U.S. Cl. 60—23                                                    10 Claims

ABSTRACT OF THE DISCLOSURE

The invention relates to a servomotor assembly with the servomotor being of the type having a piston which is displaceable by an electrically heatable expansion material. The assembly includes valve spindle means along with limit switches and mechanical spring means arranged so that when the spindle means is stopped by an abutment at the end of its stroke, the piston is allowed to continue its stroke a short distance further without unduly raising the pressure of the expansion material.

---

Figure 1:
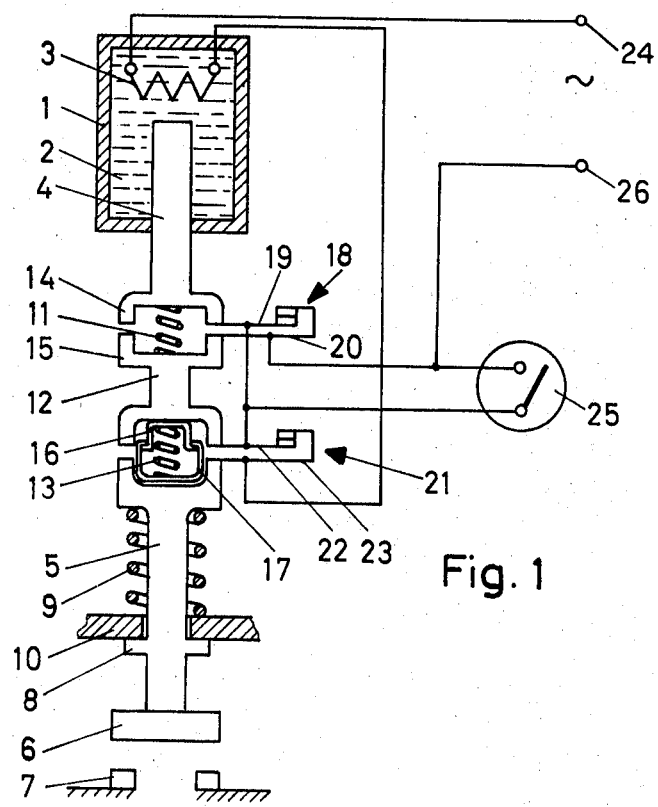

The invention relates to a servomotor comprising a piston which is displaceable by an electrically heatable expansion material and which acts upon a displaceable spindle and, in its end position, on a limit switch contained in the heating-current circuit.

A servomotor is known wherein the piston and the spindle are firmly interconnected and the spindle has a flange whereby, when the extreme end position is reached, it opens a limit switch contained in the heating-current circuit, so that further outward movement of the piston is prevented.

There are very considerable objections to using the known servomotor for such purposes where the spindle can collide with a mechanical obstacle, for example, where it is intended to cooperate with a valve seat. If the spindle collides with the obstacle while the expansible material continues to be heated, extremely large forces are set up in the servomotor which lead to mechanical damage and can press the expansible material out of its chamber. Although a limit switch, whereby the heating-current circuit can be interrupted, is present, it is nevertheless practically impossible to adjust the switch so accurately that the cut-out action occurs when the obstacle is reached (e.g. when the valve is closed) and that, on the other hand, no over-great forces occur in the system. However, even if this precise adjustment were possible, a small foreign body such as a grain of sand could impede the spindle without the limit switch having been opened. This foreign body or any other obstacle accidentally finding its way into the path of the spindle therefore leads to harmful excess pressures.

In the known servomotors, the piston is moved in one direction due to the heating up of the expansible material and in the other direction as the result of its cooling off. The lower the ambient temperature, the more rapidly the expansible material cools off and the greater the extent to which the piston is retracted. If it is assumed that the working range of the spindle is determined by a certain stroke (e.g. by the travel between the closed and open positions in the case of a valve), then this means that quantities of heat, dependent upon the ambient temperature, must be supplied to the servomotor before it is moved out of its non-operating position to a point at which the actual working stroke begins. The servomotor thus has a non-operative time that is dependent upon temperature; it is very poorly suited for use in regulating circuits.

The object of the invention is to provide a servo-motor of the initially described kind which, whilst retaining its other favourable characteristics, is rendered safe against the consequences of an obstacle being encountered and/or has no or only a short non-operative time. In particular, the servomotor is intended to be suitable for use in actuating a regulating valve.

According to the invention, this object is achieved by the end position being determined by an abutment which mechanically limits further movement of the spindle, by the piston and the spindle being displaceable relatively to each other, and by the limit switch being actuated in dependence upon the relative movement. In particular, a spring, the force of which has to be overcome to effect the relative displacement, can be clamped between the piston and the spindle.

In this construction, the limit switch is always actuated when the spindle encounters an obstacle, but the piston continues to move. This applies in the case both of intentionally provided abutments, e.g. a valve seat, and of obstacles accidentally finding their way into the path of the spindle. In all cases, actuation of the switch prevents the piston being further driven in the previous direction of movement. Consequently, no over-great forces can be set up in the servomotor. Since actuation of the switch is dependent upon the spindle actually encountering the abutment, it is not necessary for the switch to be precisely adjusted relatively to the abutment.

By the use of the spring, that force at which relative movement for actuating the switch occurs can be very precisely determined in such manner that no excessive forces occur.

A further advantage resides in the fact that any desired end position can be fixed by positioning the abutment as required. Also, it is immaterial which side the abutment is approached from. It is therefore also suitable for fixing the end position in the case of inward movement of the piston. In such case, the limit switch serves to bring in the heating-current circuit and not to interrupt it. It is therefore possible also to fix the end position for the cooling-off movement of the piston by positioning the abutment at the required point; in this position the piston is held by intermittent heating, so that it can obey the new control signal without any time-lag. Thus, with the help of the principle upon which the invention is based, it is possible to construct a valve which is intended to open when the servomotor is heated up.

If such a construction is used for both end positions, a servomotor is obtained which is rendered safe against overloading and the spindle of which has two precisely defined end positions in which it can be held by intermittent heating and obeys each control signal without any time-lag. Furthermore, the same servomotor can be used both for closing-valves and opening-valves.

More, the conditions in the two end positions do not run counter to each other, since, expediently, for one end position, the strength of the clamped spring is greater than the counter-forces, e.g. provided by a return spring, acting on the spindle during displacement, but is less than the maximum permissible load on the servo-motor. On the other hand, it is possible completely to dispense with a spring for the other end position, or for the strength of the clamped spring to be less than the counter-forces, provided by a return spring for example, and acting on the shaft during displacement.

For the purposes of a practical arrangement, the springs for the two end positions can be fitted one behind the other and the weaker spring can be bridged by a mechanical coupling after a predetermined relative movement. A certain saving in spring material can be achieved if two springs are arranged in parallel, and if one of them is effective only over such part of the deflection of the other that one spring is associated with one end position and both springs together are associated with the other end position.

A very simple construction is that wherein an intermediate part containing the springs for both end positions is fitted between the piston and the spindle. A construction of particularly short length is obtained if a weak helical compression spring is disposed inside a bush which is fitted telescopically on the spindle and on the closed base of which is engaged by the piston, and if a stronger helical compression spring surrounds the bush, and is supported at one end on a flange on the bush and at the other on a flange which is displaceable on the spindle and which bears against a stop carried by the bush but can be lifted therefrom when the bush is depressed by means of a stop carried by the spindle.

The servomotor can not only act as a two-position regulator but also as a continuously displaceable adjusting means. In this connection, it is advantageous to surround the stronger helical compression spring with a sleeve which is connected to the bush and upon which is secured an actuating member of a middle-position switch by means of a friction coupling, which actuating member can be moved to and fro between two fixed stops. The spindle is here held in the position determined by the middle-position switch, the friction coupling however permitting the spindle to be brought into any other desired intermediate position or end position.

A very simple construction is obtained if one part of each limit switch is movable with the spindle and the other part with the piston. Both limit switches can even be mounted on a common bridge secured to the spindle and their moving contacts can be actuated by two control faces connected to the bush. Furthermore, the bridge can carry a sliding contact, which co-operates with a potentiometer mounted on the housing (e.g. the vane-restoring potentiometer of a regulating circuit).

As regards the control arrangements, it is recommended that, in the case of a servomotor having two limit switches, one switch is connected in series with the other and is bridged by an off-on control switch. When a middle-position switch is used, one limit switch can also be bridged by a series arrangement comprising a further on-off control switch and the middle-position switch.

Figure 3:
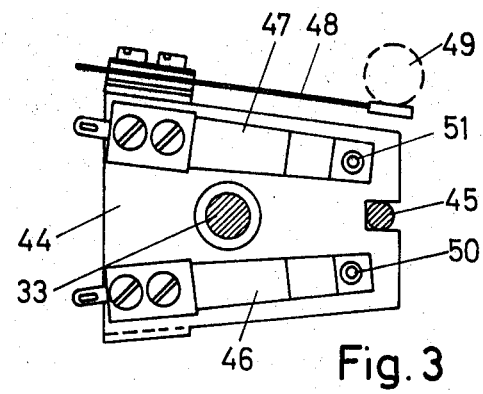
Figure 2:
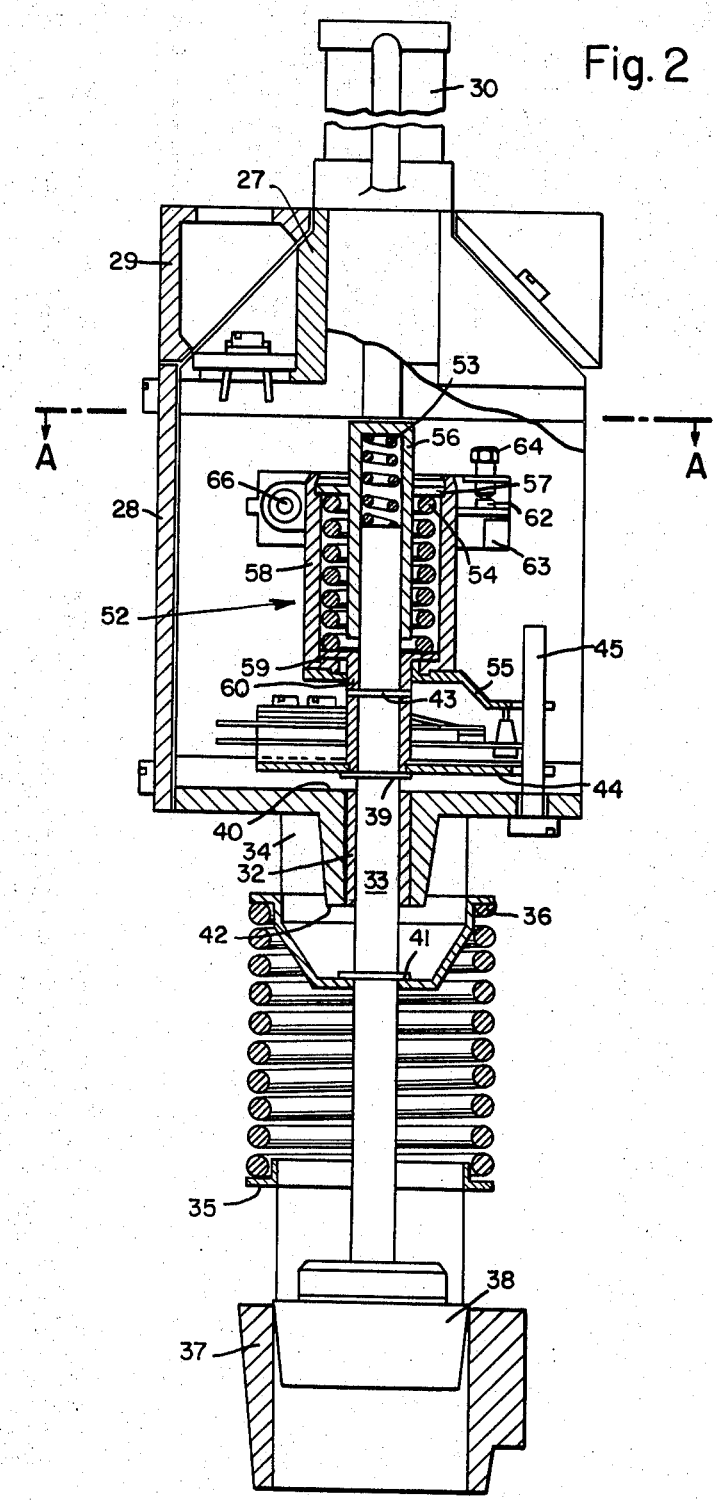
Figure 5:
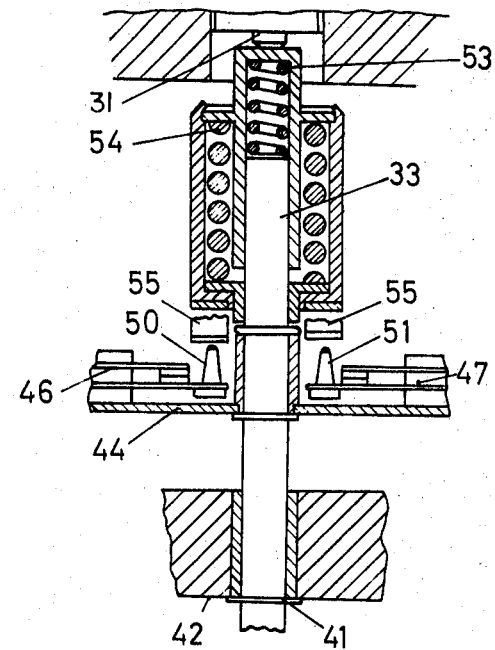
Figure 4:
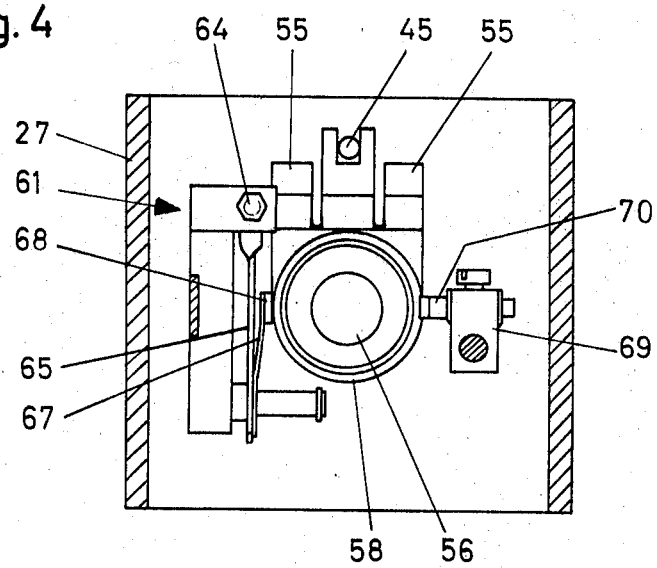
Figure 6:
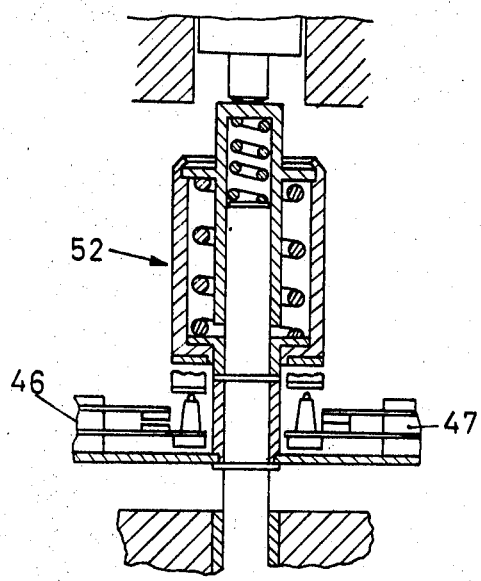
Figure 7:
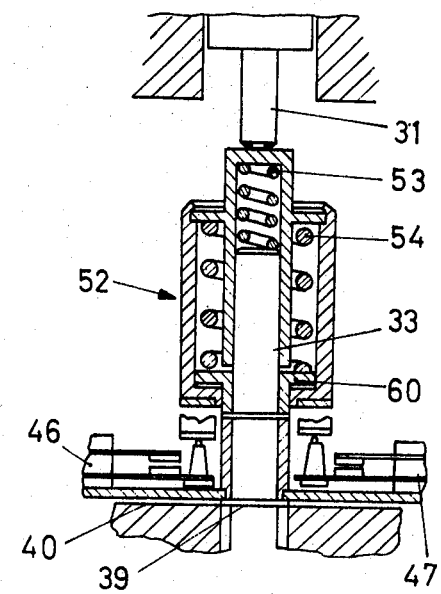
Figure 8:
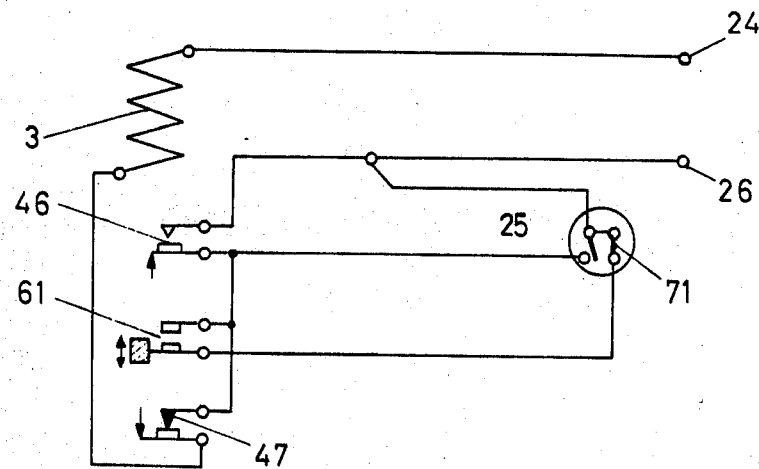

The invention will now be described in more detail by reference to embodiments illustrated in the drawing, wherein:

FIG. 1 is a schematic illustration of a first embodiment comprising two limit switches for controlling a valve, FIG. 2 is a side view, partly in longitudinal section, of a second embodiment comprising two limit switches and a middle-position switch for controlling a valve, FIG. 3 is a plan view of a switch bridge, FIG. 4 is a plan view of the intermediate part at the level of the line A—A of FIG. 2, FIG. 5 shows a schematic longitudinal section through the middle portion of the arrangement in the upper end position, FIG. 6 is a longitudinal section similar to FIG. 5 in a middle operating position, FIG. 7 is a longitudinal section similar to FIG. 5 in the lower end position, and FIG. 8 shows a control arrangement for actuating the servomotor of FIG. 2.

In the embodiment of FIG. 1, the chamber 1 contains an expansible material which expands when heated by a heating coil 2 and pushes a piston 4 outwards. The piston 4 is for actuating a valve-spindle 5, which carries a closure member 6 for covering a valve seat 7. The valve seat 7 forms a first abutment for the spindle 5. The spindle also has a flange 8 which is urged towards the valve housing 10 by a return spring 9. The housing forms a second abutment for the spindle 5.

A first spring 11, an intermediate part 12 and a second spring 13 are fitted one behind the other between the piston 4 and the spindle 5.

The first spring 11 is weaker than the return spring 9 in the end position as illustrated. When the piston 4 moves upwards, it is therefore compressed until the endfaces of the coupling members 14 and 15 on the piston 4 and the intermediate part 12 bear against each other. The spring 13 is fitted in such manner in a telescopic housing consisting of two parts 16 and 17 that it is under considerable pretension. The force of the clamped spring 13 is so rated that it is greater than the force of the return spring 9 but less than the maximum permissible load on the servomotor.

A first limit switch 18 is associated with the first spring 11. A contact 19 is connected to the piston and its co-operating contact 20 to the intermediate part. A second limit switch 21 is associated with the spring 13. A contact 22 is connected to the intermediate part and its co-operating contact 23 to the spindle 5. Both end switches open when relative movement occurs between the piston 4 and the intermediate part 12, and the intermediate part 12 and the spindle 5, respectively.

The heating coil 3 is connected by one pole directly to a terminal 24 receiving supply current. The other pole is connected to the other supply terminal 26 by way of the limit switch 21 and the limit switch 20 on a control switch 23 arranged in parallel with the latter.

Let it be assumed that, as illustrated in FIG. 1, the spindle 5 is in the upper end position, the limit switches 18 and 21 are closed and the control switch 25 is open. The expansible material is then heated. A small displacement of the piston 4 in the upward direction however opens the limit switch 18, whereupon the supply of power is interrupted. The expansible material cools off and the piston 4 is retracted. After a short time, the limit switch 18 is closed again. Due to the intermittent heating, the piston 4 and thus the spindle 5 retain the end position as illustrated, so that when the switch 25 closes, the spindle 5 is immediately brought into its other end position without any time-lag and at the speed predetermined by the heating. In this other end position, the closure member 6 encounters the valve seat 7, so that the spindle 5 is held fast, while the piston 4 continues to move. As soon as the pretension of the spring 13 is overcome, the limit switch 21 opens, whereupon the heating is interrupted. When the expansible material 2 cools off to a slight extent, the force of the spring 13 preponderates again and the switch 21 is again closed. As a consequence of the intermittent heating, the spindle 5 therefore remains in the lower end position, a closing pressure, determined by the spring 13, being maintained on the closure member 6. Mechanical overloading is not possible however, since when the spring 13 is compressed, the heating is obligatorily interrupted. After the control switch 25 has opened, the spindle 5 returns to the upper end position, as illustrated at a speed determined by the cooling off of the expansible material.

In the case of the embodiment shown in FIG. 2, a fixed housing 27, which is provided with wall plates 28 and cover parts 29, incorporates a chamber 30 for the expansible material that actuates a piston 31, as well as a bush 32 fitted in a transverse wall 31a, for guiding a spindle 33, and, mounted on a downwardly projecting attachment 34, a support 35 for a return spring 36, and a valve seat 37, which cooperates with a closure member 38 secured to the spindle 33. The other parts of the valve and its housing have been omitted for the sake of clarity.

The downward movement of the spindle is limited by a circlip 39, which cooperates with the upper side 40 of the transverse wall 31a to provide an abutment. The upward movement of the spindle 33 is limited by a circlip 41, which cooperates with the under side 42 of the bearing 32 to provide abutment, and also fixes in position a support plate for the return spring 36. A third circlip 43, cooperating with the circlip 39, holds a contact bridge 44 on the spindle. The bridge is held against rotation by means of a rod 45 and carries a switch 46 for the upper end position, a switch 47 for the lower end position and a sliding contact 48 which can cooperate with a potentiometer 49. The lower contact of each of the two switches 46 and 47 is provided with an actuating member 50 and 51.

Fitted between the piston 31 and the spindle 33 is an intermediate part 52 with two springs 53 and 54. This intermediate part is likewise guided on the rod 45 and is thus held against rotation. It carries at its lower end actuating arms 55 which can cooperate with the actuating elements 50 and 51. The intermediate part 52 has a bush 56, which is fitted telescopically on the spindle 33, is engaged on its closed base by the piston 31 and houses the spring 53 in its interior. The bush has a flange 57 which at one end acts as an abutment for the spring 54 and at the other end carries a sleeve 58. At its lower end, this sleeve, through its inwardly turned flange 59, forms a stop for a flange 60. This flange is displaceable on the spindle 33 between the stop 59 and the underside of the bush 56 and forms an abutment for the spring 54.

A middle-position switch 61 is fitted alongside the intermediate part 52. Its moving contact 62 is displaceable between a fixed stop 63 and a contact screw 64. It is mounted on a lever 65 which can be swung about a fixed pivotal point 63 having a horizontal axis. Connected to the lever by way of a spring 67 is a friction member 68 which bears on the periphery of the sleeve 58. The pressure force is so rated that the contact 62 is carried along between its two stops 63 and 64 by the intermediate part 52, the free movement of which is not however impeded when the contact 62 bears against one of the fixed stops.

Also provided alongside the intermediate part 52 is a signal emitter 69, which bears on the sleeve 58 through a sensor 70 and sends a signal when the sleeve passes a certain limiting level.

For consideration of the mode of operation, reference will be made to FIGS. 5 to 8. In FIGS. 5 to 7 the limit switches 46 and 47 have been turned so that they appear in the plane of the drawing for the sake of greater clarity. The control arrangement for the limit switches 46 and 47 corresponds to that used in the case of the limit switches 18 and 21 shown in FIG. 1, and in FIG. 8 the same reference numerals are used for the heating coil, the control switch and the connecting terminals as in FIG. 1. In the present arrangement however a series arrangement, comprising a further control switch 71 and the middle-position switch 61, is fitted in parallel with the limit switch 46. If both control switches 25 and 71 are open, the piston 31 executes an upward movement to the upper position, and if both control switches are closed, it moves downwards into the lower position; if the control switch 25 is open but the control switch 71 closed, the piston and the spindle remain in any selected intermediate position.

Let it be assumed that both control switches are open and the valve spindle has consequently assumed the upper end position illustrated in FIG. 5, wherein the circlip 41 bears against the abutment face 42. Due to cooling off, the piston 31 has retracted to an extent such that, in addition to the switch 47, the switch 46 is also closed. Consequently heating takes place and the piston is advanced. Since the spring 53 is weaker than the return spring 36, a first relative movement takes place between the piston 31 and the intermediate part 52 and the spindle 33 respectively which leads to the opening of the switch 46. This interrupts the heating and the piston is retracted again, so that the switch closes once more. Due to the intermittent heating, the piston 31 is held in the position corresponding to the upper end position of the spindle 33.

The same applies when, with the control switch 25 closed, the spindle has reached its lower end position 33 which is determined by the circlip 39 bearing against the abutment 40. In this position the flange 60 is also held if the piston 31 and the intermediate part 52 move farther downwards. Thus, this further relative movement takes place against the force of both springs 53 and 54. After a short time, the spring 47 is opened. The piston 31 retracts due to the cooling off until the switch 47 is again closed. Due to the intermittent heating, the piston 31 retains its position corresponding to the lower end position of the spindle 33.

Between the two end positions, the switch 46 is opened and the switch 47 closed, as shown in FIG. 6. If at any time during the upward or downward movement of the intermediate part 52, the control switch 25 is opened, but the control switch 71 kept closed, the middle-position switch 61 becomes effective. When the intermediate part 52 moves downwards as a result of heating up it carries the movable contact 62 with it by way of the sliding contact 58, so that the switch 61 opens. Consequently, the heating is interrupted, and the piston and the intermediate part move upwards as a result of the cooling off. This again closes the middle-position switch 61; due to intermittent heating the desired intermediate position of the spindle is thus accurately maintained.

The servomotor is very versatile in use. Without any reassembly, it can also be used for a valve that is intended to open when the expansible material heats up. By changing the springs (36, 53, 54) it is also possible to suit the system to different operating conditions and different valve characteristics.

We claim:
1. A servomotor assembly comprising, a servomotor having a piston which is displaceable by an electrically heatable expansion material, abutment means, a first displaceable member having a stroke between first and second end positions determined by said abutment means, a second displaceable member between said piston and said first member and being relatively movable with respect to said first member, first and second contacts carried by said members, said contacts being closed when said members are spaced apart a predetermined distance, clamped spring means disposed between said members, said clamped spring means having a preloaded force and having a free height equal to said predetermined distance.

2. A servomotor assembly according to claim 1 wherein said pre-loaded force must be overcome to effect relative movement between said members.

3. A servomotor assembly according to claim 2 including first resilient means biasing said first member towards said first position, the resistance force of said resilient means when said first member is in said second position being less than said preloaded force.

4. A servomotor assembly according to claim 3 wherein said second displaceable member is relatively movable with respect to said piston, third and fourth contacts carried by said piston and said second member which are closed when said piston and said second member are spaced apart a predetermined distance, second resilient means between said piston and said second member which is weaker than said first resilient means.

5. A servomotor assembly according to claim 3 wherein said first resilient means and said clamped spring means are arranged in parallel.

6. A servomotor assembly comprising, a servomotor having a piston which is displaceable by an electrically heatable expansion material, abutment means, a spindle having a stroke between first and second end positions determined by said abutment means, a capped bushing slidably disposed on said spindle with the cap thereof engageable with said piston, a relatively weak spring biasing said bushing towards said piston and said spindle towards said second end position, a flange on said bushing, a bush having a flange slidably disposed on said spindle beneath said capped bushing, a sleeve surrounding said bushing and being fixedly attached to said flange thereof, a clamped spring in said sleeve being clamped between said flanges of said bushing and said bush, upper and lower limit switches carried by said spindle, switch actuators carried by said sleeve, and a relatively strong spring biasing said spindle towards said first position.

7. A servomotor assembly according to claim 6 including switch means carried by said sleeve with a friction coupling, said switch means having spaced apart stops, and a switch actuating means movable between said stops.

8. A servomotor assembly according to claim 6 having a single bridge support member for said limit switches.

9. A servomotor assembly according to claim 6 having a single bridge support member for said limit switches, a potentiometer attached to said casing, said bridge having a contact which slidably engages said potentiometer.

10. A servomotor assembly according to claim 6 wherein said limit switches are series connected, one of said limit switches being bridged by an on-off control switch.

References Cited

UNITED STATES PATENTS

| | | | |
|---|---|---|---|
| 1,337,764 | 4/1920 | Gold | 60—23 |
| 3,031,858 | 5/1962 | Dahl et al. | 60—23X |
| 3,173,244 | 3/1965 | Schutmaat | 60—23 |
| 3,213,606 | 10/1965 | Martin et al. | 60—23 |
| 3,266,235 | 8/1966 | Carlson, Jr. | 60—23 |
| 3,431,726 | 3/1969 | Iversen | 60—23 |

MARTIN P. SCHWADRON, Primary Examiner

R. R. BUNEVICH, Assistant Examiner

U.S. Cl. X.R.

251—11